Feb. 26, 1952         D. E. BECKETT ET AL         2,586,906
                            VALVE
Filed Oct. 1, 1947                        2 SHEETS—SHEET 1

INVENTORS
DONALD E. BECKETT
WILLIAM N. BECKETT
BY
J. Warren Kinney Jr.
ATTORNEY

Feb. 26, 1952  D. E. BECKETT ET AL  2,586,906
VALVE
Filed Oct. 1, 1947  2 SHEETS—SHEET 2

*INVENTORS*
DONALD E. BECKETT
WILLIAM N. BECKETT
BY
*J. Warren Kinney, Jr.*
ATTORNEY Patented Feb. 26, 1952

2,586,906

UNITED STATES PATENT OFFICE 2,586,906

VALVE

Donald E. Beckett and William N. Beckett, Wilmington, Ohio, assignors of one-fourth to Heber W. Harcum and one-fourth to J. Bates Harcum, both of Wilmington, Ohio Application October 1, 1947, Serial No. 777,278

8 Claims. (Cl. 137—139)

This invention relates to valves, and more particularly to a compact, heavy duty, high speed valve for controlling both pneumatic and hydraulic pressures.

An object of the invention is to provide a simple two element valve comprising a housing and a piston rod adapted to control pressures from as low as ½ p. s. i. up to several hundred p. s. i.

To the best of our knowledge, the fastest operating control valves presently on the market are so-called solenoid operated valves, the fastest acting of which have an operational rate of less than 700 cycles per minute. These valves are quite bulky and expensive. In sharp contrast with such valves, our valve is capable of operating speeds ranging from 1 cycle per minute to more than 2300 cycles per minute for indefinite and prolonged periods of time, whereby it is ideally suited for many and varied industrial applications.

Another object of our invention is to provide a valve wherein the speed, rate, and direction of travel of the work producing mechanism being controlled by said valve may be accurately governed and quickly and easily changed without altering the valve or requiring the use of special tools.

Still another object of the invention is to provide a valve for controlling the operating characteristics of work producing mechanisms, such as, by way of example, air cylinders and the like, for cyclic rates ranging from 1 to 2300 per minute wherein the limits of travel of the pistons of such mechanisms are controlled to within one thousandth of an inch, thereby effecting greater accuracy of control than heretofore possible and without requiring the use of special equipment.

A further object of the invention is to provide a valve which will automatically cleanse itself of any and all foreign material which might enter said valve by way of an intake port. This feature is of particular importance since it eliminates delays such as are presently encountered by users of other types of valves which are rendered inoperative by reason of foreign particles entering and fouling the valve mechanism.

Still a further object of our invention is to provide a valve having the hereinabove described characteristics which is free of objectionable back pressures on the valve stem. In our device the valve pistons operate under sufficiently balanced conditions, whereby the valve stem or rod will remain in whatever portion of its stroke it is initially placed without requiring the use of latching or holding devices for maintaining said valve stem in its selected position. This feature is of particular importance in those instances when our valve is used in conjunction with solenoid controls which need be energized only long enough to shift the valve stem to the end of its stroke where it will remain without the need of restraining means until again acted upon by another positive force, externally applied.

Another object of our invention is to provide a valve which will directly control the flow of pneumatic or hydraulic media to work producing mechanisms, thereby eliminating the need for pilot valves and other types of control and check valves presently used in pneumatic and hydraulic control systems.

A further object of our invention is to provide a valve having the hereinabove described characteristics and which is so extremely sensitive that movement of the valve stem by as little as two and one-half thousandths of an inch in either direction from a port closing position will render its control characteristics effective.

Still a further object of our invention is to provide a valve having a piston rod which extends outwardly beyond the ends of the valve body and which is provided with means adjustable relative to said rod for controlling the stroke characteristics of said piston rod, which in turn determines the direction and relative speed of the forward and return strokes of the work mechanism controlled by said valve. If desired, the forward and return strokes of said mechanism may be of equal speed, or the travel in one direction may be slow or fast relative to the rate of travel in the other direction, thereby providing maximum flexibility of operational control from the valve itself. This is in sharp contrast with the speed control systems heretofore used since we have completely eliminated the need of costly auxiliary speed control mechanisms and valves which were essential to and inherent in other systems. We accomplish precision speed control in the very same valve which selectively controls the flow of pressure media to the work producing mechanism, and as above indicated, the speed control characteristics may be quickly varied or changed by resetting the adjustable means carried on the ends of the piston rod.

A further object of our invention is to provide a control valve for governing to .001 of an inch the stroke characteristics of a work producing mechanism controlled thereby.

Another object of the invention is to provide a valve having the hereinabove described characteristics which may be inexpensively fabricated using modern mass production techniques, and which is further characterized by the absence of complicated parts and packing.

These and other objects are attained by the means described herein and as disclosed in the accompanying drawings, in which.

Figure 1:
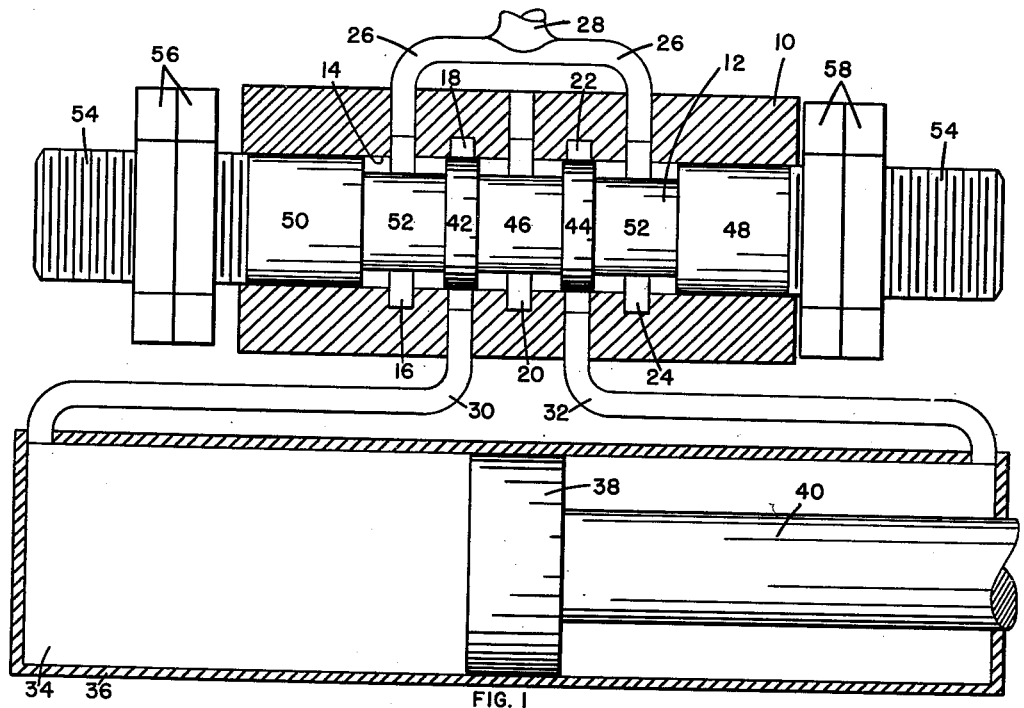
Fig. 1 is a sectional plan view of a valve embodying the teachings of the present invention operatively connected with an air cylinder controlled thereby.
Figure 2:
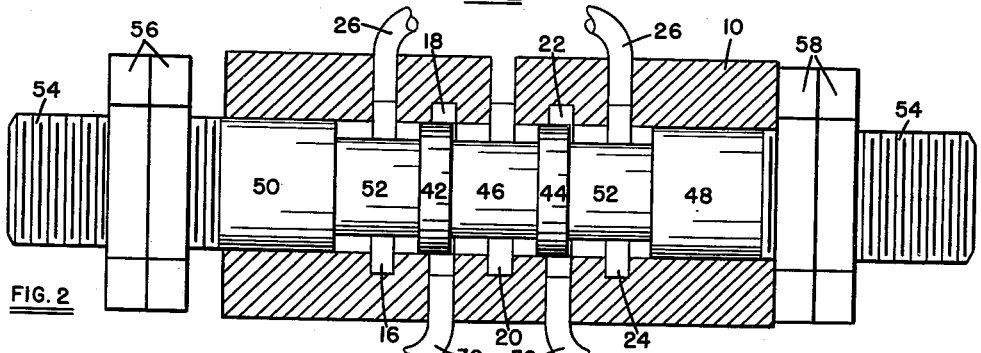
Figs. 2 and 3 are views similar to Fig. 1 but illustrating various operative locations of the pistons.
Figure 3:
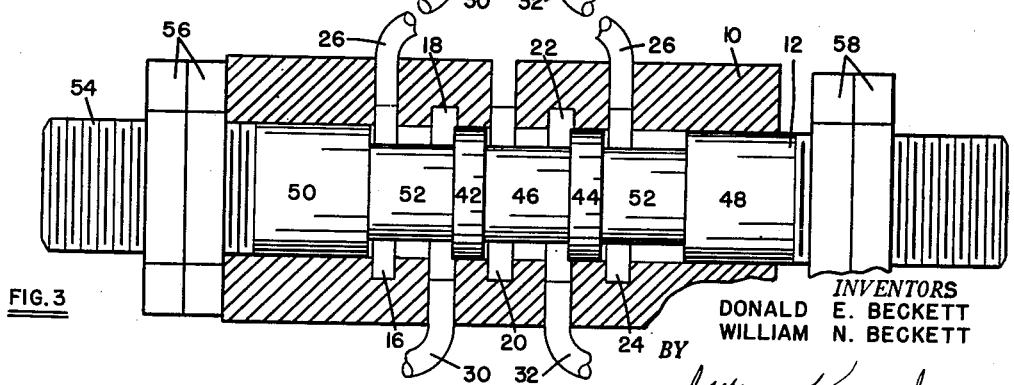

With reference now to Figs. 1 to 3, inclusive, it will be noted that our valve comprises, generally speaking, a housing or body portion 10 and a piston rod 12 mounted for reciprocation therein. Housing 10 may, if desired, be fabricated from bronze, whereas the piston rod may be fabricated from stainless steel. As clearly indicated in the drawings, the housing and piston rod are each of unitary or one-piece construction.

Housing 10 is provided with a longitudinal bore or passageway 14 of uniform diameter throughout its length. A plurality of annular, laterally spaced ports, denoted by the numerals 16, 18, 20, 22 and 24 are provided interiorly of the housing as illustrated. In the preferred embodiment of the invention, the overall width of each of said ports is the same.

Figure 9:
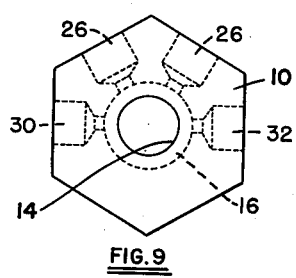
Fig. 9 is an end view of the valve housing of Fig. 1 illustrating a detail of the construction of said housing.

At this point, it should be observed that the various port connections illustrated in Figs. 1 to 3, inclusive, are schematic and have been indicated solely to facilitate ease of understanding of the operating characteristics of the valve. In actual practice, we have found that the most satisfactory disposition of the location of said ports is illustrated in Fig. 9, wherein housing 10 is hexagonal in shape, and wherein the various ports are located in the two side and upper faces, as illustrated.

With reference again to Fig. 1, it will be observed that ports 16 and 24 comprise pressure or intake ports which may be suitably connected by means of tubing 26 to a source 28 of air, or other fluid, under pressure.

Ports 18 and 22 comprise work or outlet ports which may be connected by means of tubing 30 and 32 to opposite ends of a work producing mechanism, such as an air cylinder denoted generally by the numeral 34. The present invention is not concerned with nor directed to any particular type of work producing mechanism, the one disclosed being illustrative rather than restrictive and comprising, solely by way of example, an outer casing 36, a piston 38 and a piston rod 40. It will be understood that the piston rod may be operatively secured to suitable mechanisms not illustrated.

The central port 20 comprises an exhaust port which may, if desired, discharge directly into the air.

Piston rod 12 is provided with a pair of laterally spaced pistons 42 and 44, which are separated by means of a connecting portion 46 of reduced diameter. In the preferred embodiment of the invention, the overall width of each of pistons 42 and 44 may be of a dimension from five to twenty thousandths of an inch greater than the overall width of the work ports 18 and 22.

Piston rod 12 likewise includes end piston members 48 and 50, the overall length of each of which are of a dimension from three to five times the width of the various ports 16, 18, 20, 22 and 24. Those portions of the piston rod denoted by the numerals 52 and disposed respectively between pistons 42 and 50, 44 and 48 are of a diameter equal to that of central portion 46. The length dimension of portions 52 is of a dimension sufficient to preclude covering of either of ports 16 or 24 incident to maximum movement of the piston rod relative to housing 10 and its associated ports. By thus making all the pistons of equal area a so-called balanced valve effect will be obtained by the action of pressures against the equal and opposite shoulders or working areas of the pistons.

By reason of said balanced valve effect longitudinal shifting of the valve stem may be accomplished by the application of light or small forces to the ends thereof. By way of example, the valve stem may be easily shifted by force applied by the index finger of a person, even when the valve is being used to control pressures as great as 500–600 p. s. i. The balanced valve effect likewise causes the valve stem to remain in whatever position it is initially placed, and in which position it will remain without the need of restraining means, until moved to another position.

Preferably, though not necessarily, we thread, as at 54, those portions of the piston rod disposed beyond pistons 48 and 50. Pairs of lock nuts 56 and 58 may engage threaded portions 54 of the valve stem for limiting the stroke characteristics of the piston rod.

With particular reference now to Fig. 1, it will be noted that pistons 42 and 44 are centered in obstructing relationship with ports 18 and 22, and that lock nuts 56 are spaced farther from the end of housing 10 than are lock nuts 58 whereby the stroke of the valve stem to the right will exceed that to the left.

When pistons 42 and 44 are disposed in the neutral or closed position, with reference to work ports 18 and 22, as illustrated in Fig. 1, the flow of pressure media through the valve to air cylinder 34 is effectively blocked, wherefore piston 38 will remain stationary until such time as valve stem 12 is actuated for re-establishing a flow of pressure media to the air cylinder.

At this point, it should be observed that the line, or intake pressures in ports 16 and 24 are equal, and since the adjacent faces of pistons 42 and 50, and of pistons 44 and 48 present equal areas, valve stem 12 will remain in the balanced position illustrated until such time as it is shifted by the application of an outside force to the ends thereof.

In Fig. 2 the valve stem of Fig. 1 is illustrated at the left end of its stroke, as determined by the abutment of lock nuts 58 with the end of housing 10. Work port 22 has been slightly uncovered on its pressure side thereby permitting a flow of air or other pressure media from pressure port 24 into conduit 32. Simultaneously therewith piston 42 has uncovered work port 18 on its exhaust side thereby enabling the pressure media on the left side of piston 38 to be exhausted via port 20.

In Fig. 3 the valve stem of Fig. 1 is illustrated at the right end of its stroke, as determined by the abutment of lock nuts 56 with the valve housing, whereby conduit 30 is connected to pressure port 16 via work port 18; and conduit 32 is connected to exhaust port 20 via work port 22.

A comparison of Figs. 2 and 3 will indicate that the pressure media will pass slowly through the small apertures provided between pistons 42 and 44 and their respective ports 18 and 22 of Fig. 2, whereas it will pass rapidly through the large apertures provided between said pistons and said ports in Fig. 3. In this manner our valve may be utilized to effectively and accurately determine the relative rates of travel of the forward and return strokes of a work producing mechanism. Quite obviously if the stroke on opposite sides of the closed or neutral position of Fig. 1 be equal, the rate of travel of the forward and return strokes of the work developing mechanism will be equal.

Figure 8:
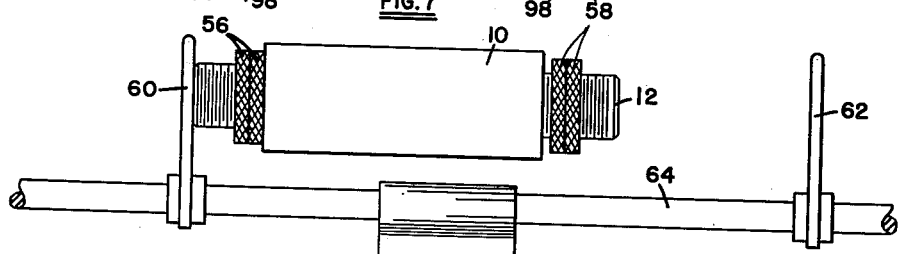
Fig. 8 is a side view of a valve of Figs. 1–3 in combination with another type of valve shifting means.

With reference now to Fig. 8 it will be observed that valve stem 12 may be shifted from one end of its stroke to the other by means of a pair of interfering members such as 60 and 62, each of which may be adjustably secured relative to a reciprocable supporting member 64 secured by means of a bracket 66 to a reciprocating or oscillating portion of the work developing mechanism controlled by the valve. The valve stem is illustrated in Fig. 8 as having just been shifted to the right end of its stroke, it being understood that the supporting member will be shifted to the left for causing interfering member 62 to engage the right end of the piston rod for reversing the direction of travel of the work mechanism and of member 64.

Figure 4:
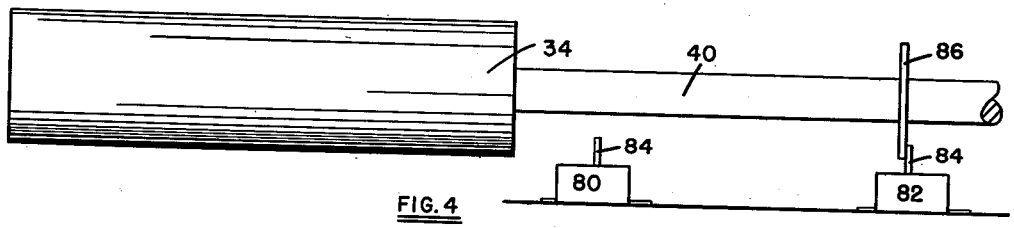
Fig. 4 is a diagrammatic view of an air cylinder of the type controlled by our valve, in combination with a pair of limit switches.
Figure 5:
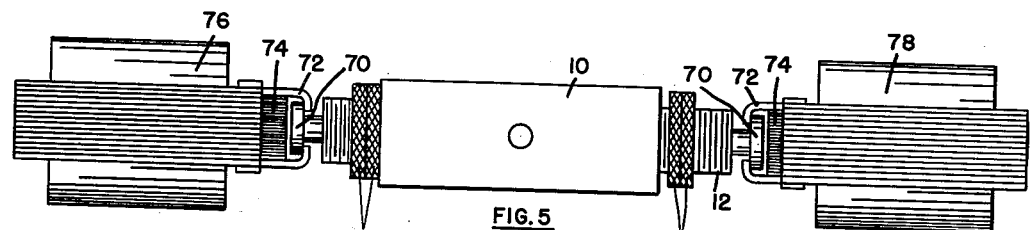
Fig. 5 is a top plan view of a valve embodying the teachings of the present invention which is operatively associated with a pair of valve stem shifting solenoids.

In Fig. 5 the opposite ends of the piston rod have been provided with buttons 70 each of which are engageable by elements 72 of the armatures 74 of solenoids indicated generally by the numerals 76 and 78. The solenoids may be energized by means of suitable switches such as the limit switches 80 and 82 of Fig. 4, each of which include an arm 84 contactable by interfering member 86 secured to and carried by piston rod 40 of an air cylinder 34. Contact of arm 84 of limit switch 82 has just been made and solenoid 78 has been momentarily energized to pull valve stem 12 to the right as far as the position of lock nuts 56 will permit. The inherent characteristics of our balanced valve make it possible and practicable to immediately deenergize the solenoids upon completion of each stroke of the valve stem.

Figure 6:
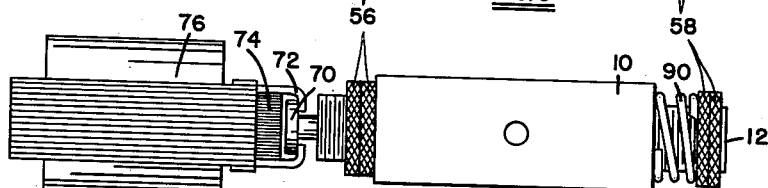
Fig. 6 is a top plan view similar to Fig. 5, but wherein one solenoid has been replaced by a tension spring.

In Fig. 6 a tension spring 90 has been interposed between the right end of the valve housing 10 and lock nuts 58 thereby normally and yieldingly urging the valve stem to the right end of its stroke. A solenoid 76 is illustrated operatively connected with the left end of the piston rod for shifting it to the left, against the counterface of spring 90, during those periods of time when the solenoid is energized. The moment the solenoid is deenergized, the piston rod will be snapped to the opposite end of its stroke by spring 90.

Figure 7:
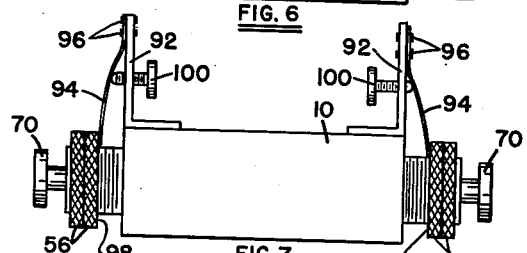
Fig. 7 is a side plan view of the modified type of valve control comprising a detail of the present invention.

In Fig. 7 a so-called spring-balanced valve assembly is disclosed wherein the valve stem will be automatically returned to a preselected intermediate setting after having been shifted to one end or the other of its stroke by solenoid action, by manual means or by mechanical means such as disclosed in Fig. 8.

A pair of brackets each including an upwardly extending leg 92 may be secured to or relative to housing 10 for providing mounting means for spring elements 94 which may be secured to said leg by means of rivets 96, or other suitable means. The lower or free end of the spring elements are adapted to engage the inner face 98 of the innermost of the pairs of lock nuts carried by valve stem 12. Set screws 100, threadably mounted in legs 92 are provided for adjusting the relative tension of the spring elements.

If desired, spring elements 94 may be adjusted whereby to normally center the valve stem to a position as disclosed in Fig. 1 in which event the operating cycle of the work producing mechanism controlled by the valve would be automatically halted whenever the external valve stem shifting force, whether electrical, manual or mechanical, is terminated.

The assembly of Fig. 7 effectively solves intermittent control problems encountered in shops where an operator has a conveniently located foot or hand actuatable switch for controlling the operating characteristics of solenoids such as 76 and 78 of Fig. 5.

At this point it should be clearly understood that there is a basic distinction between the assemblies of Figs. 5 and 7 in that in Fig. 5 the valve stem will remain at whatever end of its stroke it is last pulled by the solenoids, whereas in Fig. 7 the valve stem will remain at the end of its stroke only during those periods of time when one or the other of the solenoids of Fig. 5 is energized. As soon as deenergization of the solenoids occurs, the valve stem will shift, under the action of spring elements 94 to a preselected intermediate position.

With reference again to Figs. 1-3, it will be observed that central portion 46 of the valve stem is always in open communication with exhaust port 20. It will be further noted that ports 52 are likewise always in open communication with their respective intake ports 16 and 24 which are always connected by means of conduit 26 to a source of pressure media.

It will likewise be noted that our valve is free of packing. We have found that lubrication of our valve is effectively accomplished by the lubricant contained in the pressure media being controlled by our valve, whereof, the valve is, in effect, self or automatically lubricated and as hereinbefore stated our valve has been successfully operated for prolonged periods of time at cyclic rates up to 2300 per minute.

As hereinbefore indicated, the valve of the present invention may be used to control or limit the stroke characteristics of various work producing mechanisms with which they are operatively associated for effecting stroke control as close as one thousandth of an inch, without requiring special equipment or additional control apparatus other than the valve itself and, of course, some type of valve actuating or valve shifting mechanism, such as, by way of example, are disclosed in Figs. 4-8, inclusive. We are able to accomplish such a high degree of control by reason of the balanced valve effect, and the hereinabove described relationship between the overall width of pistons 42 and 44 relative to their respective work ports 18 and 22.

In those instances where it is desirable to provide a control valve manually operable in but one direction, the valve set-up of Fig. 6 may be utilized with solenoid 76 removed. The valve may then be shifted to the left end of its stroke by means of pressure applied to the right end of valve stem 12. As soon as this application of force has been terminated, the valve stem will be automatically shifted to the right end of its stroke by spring 90.

In addition to the control characteristics hereinabove enumerated our valve is ideally adapted to impart vibratory action to the work mechanism, such as, by way of example, may be utilized in sifting, shaking and similar operations in foundries, pottery plants, packaging plants and the like. The desired action may be obtained by using a set-up such as disclosed in Fig. 6 but wherein the operating characteristics of solenoid 76 are controlled by a limit switch, as follows: Spring 90 will pull the valve to the right end of its stroke (Fig. 3) thereby introducing pressure media via conduit 30 to the left end of air cylinder 34 for moving piston rod 40 to the right until interfering member 86, Fig. 4, contacts arm 84 of limit switch 82 for energizing solenoid 76 and thereby shifting the valve, against the counterforce of spring 90, to the left. This will reverse the flow of pressure media from the left end of the cylinder to the right whereupon piston rod 40 will be moved to the left. However, the moment solenoid 76 is deenergized spring 90 will again shift the valve to the right (Fig. 3) whereupon the cycle will be repeated. In this simple manner piston rod 40 will be caused to vibrate at a very rapid cyclic rate until such time as the solenoid is energized, by way of an auxiliary circuit separate and apart from limit switch 82, for terminating the vibratory action.

It should be understood that various changes and modifications may be made, within the scope of the appended claims, without departing from the spirit of the invention.

What is claimed is:

1. An air valve comprising a housing having a longitudinal bore extending therethrough, five annular ports provided interiorly of said housing and in open communication with said bore, each of said ports individually interconnected with the exterior of said housing, a piston rod having a mean diameter dimensioned for sliding fit with the bore of said housing, the overall length of said rod exceeding the longitudinal dimension of said housing, a pair of pistons provided centrally of said rod, said pistons laterally spaced by a dimension equal to the spacing between the second and fourth of said five annular ports, and wherein the overall width of each of said pistons exceeds the individual width of the second and the fourth annular ports by substantially .005 of an inch, a second pair of pistons located one each in spaced relationship with said first mentioned pistons, said piston rod being reduced in diameter intermediate adjacent pistons for providing three laterally spaced chambers the central one of which is at all times in open communication with the centermost of said five ports and the other two of which are at all times in open communication with the endmost of said ports, and longitudinally adjustable means secured to and carried by the ends of said piston rod which project outwardly from the ends of said housing, said means engageable with the ends of said housing for selectively controlling the stroke characteristics of said piston rod and the flow control characteristics of said valve, 2. An air valve comprising a housing having a bore extending longitudinally therethrough, five annular ports in laterally spaced relationship disposed along and in open communication with said bore, a valve stem mounted for reciprocation in said bore, said stem including a pair of valving pistons for opening and closing certain of said ports wherein the width dimension of each of said pistons is of a dimension only .005 of an inch greater than the overall width of their respective ports and a second pair of pistons, one on either side of said first pair wherein the diameter and area of the side faces of all of the pistons are equal and wherein the pistons of the second pair are spaced from their respective adjacent valving pistons for precluding interference of the pistons comprising the second pair with said ports incident to actuation of the valve.

3. A two-element valve comprising a housing having a longitudinal bore extending therethrough and a plurality of annular ports in open communication therewith, a piston rod reciprocably mounted in said bore, said rod extending beyond said housing at opposite ends thereof, valving pistons on said rod for cooperation with various of said ports wherein the width of said pistons exceeds by .005 to .020 the width dimension of the individual ports, and a pair of sealing pistons one at either end of the rod, wherein the diameter, area and lateral spacing between the adjacent end faces of each of said valving and sealing pistons are substantially equal, adjustable stop members secured to and carried by the ends of said rod, said members adapted to alternately abut opposite ends of said housing for limiting the movement of said pistons relative to said ports, a pair of solenoids each including an armature, means operable for interconnecting said armatures one each to an end of said piston rod, and means operable for momentarily energizing one or the other of said solenoids for shifting said rod to the opposite end of its stroke where it will remain in free condition until shifted by another externally applied force.

4. An externally actuated air valve comprising a housing having a longitudinal bore extending therethrough, a plurality of annular ports in laterally spaced relationship disposed along and in open communication with said bore, a valve stem mounted for free reciprocation in said bore, lands on said stem for controlling the flow of pressure media through adjacent ports wherein the width dimension of each of said lands exceeds the overall width of said ports by a dimension from .005 to .020 for precluding internally induced movement of the stem by reason of the pressure or flow of pressure media through the valve, and a pair of pistons one on either side of said lands wherein the diameter, area and lateral spacing between the adjacent side faces of said lands and pistons are equal, and wherein the pistons are spaced from said lands for precluding interference of said pistons with said ports incident to actuation of the valve.

5. A two element valve comprising a housing having a longitudinal bore extending therethrough and a plurality of annular ports in open communication therewith, a valve stem reciprocably mounted in said bore and extending beyond said housing at opposite ends thereof, valving pistons on said stem for cooperation with various of said ports wherein the width dimension of said pistons exceeds the width dimension of said individual ports by an amount from .005 to .020 and wherein the areas of each of said pistons are substantially equal for precluding internally induced axial movement of the stem from a preset position incident to the flow of pressure media through the valve, and a pair of sealing pistons one at either end of said stem of a diameter substantially equal to the diameter of the valving pistons from which they are spaced for precluding interference with said ports incident to actuation of the valve.

6. A two element valve comprising a housing having a bore of substantially uniform diameter extending therethrough and a plurality of ports in open communication therewith, a valve stem reciprocably mounted in said bore, said stem having portions thereof undercut to provide a pair of laterally spaced similar valving pistons and a pair of similar sealing pistons located at the outer ends thereof, wherein the spacing between adjacent sides of adjacent ports is substantially equal and of a dimension substantially equal to the width dimension of a valving piston, wherein the spacing between adjacent faces of adjacent pistons is substantially equal and wherein the width dimension of each valving piston exceeds the width dimension of the individual ports by .005 to .020 for precluding internally induced axial movement of the valve stem from a pre-set position incident to the flow of pressure media through the ports of said valve.

7. A two element valve comprising a housing having a bore of substantially uniform diameter extending therethrough and a plurality of similar, equally spaced annular ports in open communication therewith, a free valve stem reciprocably mounted in said bore, said stem having portions thereof undercut to provide a pair of laterally spaced similar valving pistons and a pair of similar sealing pistons located at the outer ends thereof, wherein the spacing between adjacent faces of adjacent pistons is equal for precluding interference of the sealing pistons with said ports incident to actuation of the valve stem, and wherein the width dimension of each valving piston exceeds by .005 to .020 the width dimension of the individual ports for providing an overlap sufficiently large to prevent leakage but sufficiently small to preclude internally induced axial movement of the free valve stem from a pre-set position incident to the flow of pressure media through the valve.

8. A two element valve comprising a housing including a pair of laterally spaced ends, said housing having a bore of substantially uniform diameter extending axially therethrough between said ends, a plurality of annular ports in open communication with said bore, a free piston rod reciprocably mounted in said bore, a pair of valving pistons disposed centrally of said rod and a pair of sealing pistons located beyond and spaced from the endmost ports for precluding interference with said ports incident to actuation of the piston rod, stop members adjustably secured to and carried by the ends of said rod engageable with the ends of the housing for determining the overall stroke of said rod and the relationship of said pistons with respect to said annular ports for controlling the operating characteristics of a device controlled by the valve, wherein the diameter and area of the side faces of said valving and sealing pistons are equal, and wherein the width dimension of each of said valving pistons exceeds by .005 to .020 the width dimension of the individual ports for precluding internally induced axial movement of the piston rod between the limits determined by said stop members incident to the flow of pressure media through the valve.

DONALD E. BECKETT.
WILLIAM N. BECKETT.

REFERENCES CITED

The following references are of record in the file of this patent:

UNITED STATES PATENTS

| Number | Name | Date |
|---|---|---|
| 318,247 | Harvey | May 19, 1885 |
| 711,121 | Porter | Oct. 14, 1902 |
| 1,092,718 | Johnson | Apr. 7, 1914 |
| 1,464,303 | Whitelaw | Aug. 7, 1923 |
| 2,145,977 | Foster | Feb. 7, 1939 |
| 2,159,610 | West | May 23, 1939 |
| 2,180,817 | Nye | Nov. 21, 1939 |
| 2,219,896 | Harrington | Oct. 29, 1940 |
| 2,251,747 | Losey | Aug. 5, 1941 |
| 2,251,750 | Miller | Aug. 5, 1941 |
| 2,374,593 | Ernst | Apr. 24, 1945 |

FOREIGN PATENTS

| Number | Country | Date |
|---|---|---|
| 589,937 | Germany | Dec. 18, 1933 |